US010060522B2

(12) United States Patent
Furusawa et al.

(10) Patent No.: US 10,060,522 B2
(45) Date of Patent: Aug. 28, 2018

(54) SCREW DEVICE COOLING NOZZLE AND MOTION GUIDE DEVICE COOLING NOZZLE

(71) Applicant: THK CO., LTD., Tokyo (JP)

(72) Inventors: Ryuji Furusawa, Tokyo (JP); Shinji Aoki, Tokyo (JP); Satoshi Kashiwagura, Tokyo (JP); Bin Zhao, Tokyo (JP); Ryunosuke Ozeki, Tokyo (JP); Marie Horikawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/324,937

(22) PCT Filed: Jul. 7, 2015

(86) PCT No.: PCT/JP2015/069497
§ 371 (c)(1),
(2) Date: Jan. 9, 2017

(87) PCT Pub. No.: WO2016/009889
PCT Pub. Date: Jan. 21, 2016

(65) Prior Publication Data
US 2017/0211687 A1 Jul. 27, 2017

(30) Foreign Application Priority Data

Jul. 18, 2014 (JP) .................. 2014-147836
Dec. 25, 2014 (JP) .................. 2014-262953

(51) Int. Cl.
*F16H 1/24* (2006.01)
*F16H 57/04* (2010.01)
*F16H 25/22* (2006.01)

(52) U.S. Cl.
CPC ..... *F16H 57/0497* (2013.01); *F16H 25/2204* (2013.01); *F16H 57/0456* (2013.01)

(58) Field of Classification Search
CPC ............ F16H 57/0497; F16H 25/2204; F16H 57/0456; F16H 25/2418; F16H 57/0412; F16H 25/2209
See application file for complete search history.

(56) References Cited

U.S. PATENT DOCUMENTS 3,068,713 A * 12/1962 Davis .................. F16H 25/2204
   184/6
4,518,148 A * 5/1985 Renfro .................... E21B 34/02
   137/312

(Continued)

FOREIGN PATENT DOCUMENTS

CN   103591237 A   2/2014
EP   1 647 740 A1   4/2006
(Continued)

OTHER PUBLICATIONS

International Serach Report dated Oct. 6, 2015, issued in counterpart of Application No. PCT/JP2015/069497 (1 pages).
(Continued)

*Primary Examiner* — Zakaria Elahmadi
(74) *Attorney, Agent, or Firm* — Westerman, Hattori, Daniels & Adrian, LLP

(57) ABSTRACT

Provided is a screw device nozzle that can gas-cool a screw device effectively. A screw device cooling nozzle (4) of the present invention is placed in such a manner as to surround at least one of a screw shaft (1) and a nut (2). The cooling nozzle (4) includes an internal passage (8) into which gas is introduced, an opening (7) for releasing the gas flow introduced into the internal passage (8), a deflection surface (27), provided adjacent to the opening (7), for bending the gas flow released from the opening (7), and a guide path (10) for drawing in gas outside the cooling nozzle (4).

16 Claims, 19 Drawing Sheets

(56) References Cited

U.S. PATENT DOCUMENTS

| | | | | |
|---|---|---|---|---|
| 4,840,077 A * | 6/1989 | Katahira | ............... | B08B 15/00 74/441 |
| 5,167,420 A * | 12/1992 | Gregory | ............... | C03B 23/045 279/121 |
| 5,203,222 A * | 4/1993 | Hirai | ............... | F16H 25/2018 74/665 A |
| 5,242,033 A * | 9/1993 | Toraason | ............... | F16H 57/0412 184/6.12 |
| 5,415,489 A * | 5/1995 | Hutchins | ............... | F04B 7/0076 403/122 |
| 5,868,032 A * | 2/1999 | Laskey | ............... | F16F 9/58 188/322.12 |
| 5,906,136 A * | 5/1999 | Yabe | ............... | F16C 33/3713 277/562 |
| 6,007,286 A * | 12/1999 | Toyota | ............... | F16H 57/041 411/428 |
| 6,023,991 A * | 2/2000 | Yabe | ............... | F16H 25/2418 74/89.44 |
| 2002/0152822 A1* | 10/2002 | Chuo | ............... | G01D 5/147 73/862.332 |
| 2004/0061382 A1* | 4/2004 | Schreier | ............... | F16H 25/20 310/13 |
| 2005/0255186 A1* | 11/2005 | Hiraga | ............... | B29C 45/83 425/542 |
| 2008/0193064 A1* | 8/2008 | Roders | ............... | B23Q 1/017 384/45 |
| 2011/0048146 A1 | 3/2011 | Ou et al. | | |
| 2012/0042741 A1* | 2/2012 | Jacob | ............... | F16H 57/0401 74/89.44 |
| 2014/0116166 A1* | 5/2014 | Yamamoto | ............ | F16H 25/2204 74/89.4 |
| 2015/0041278 A1* | 2/2015 | Naubert | ............... | F16D 11/12 192/85.63 |
| 2015/0300255 A1* | 10/2015 | Gallet | ............... | F16H 57/0423 475/159 |
| 2015/0362061 A1* | 12/2015 | Nagai | ............... | F16C 37/007 74/424.82 |
| 2016/0025199 A1* | 1/2016 | Boone | ............... | F16H 25/2204 74/89.38 |
| 2016/0169104 A1* | 6/2016 | Rowe | ............... | F16K 31/047 251/29.12 |
| 2016/0298789 A1* | 10/2016 | Dubus | ............... | F16H 25/2252 |
| 2017/0023124 A1* | 1/2017 | Minakuchi | ............ | F16H 57/0497 |
| 2017/0107792 A1* | 4/2017 | Lee | ............... | E21B 34/14 |

FOREIGN PATENT DOCUMENTS

| | | |
|---|---|---|
| JP | 60-62438 A | 4/1985 |
| JP | 2002-310258 A | 10/2002 |
| JP | 2008-544185 A | 12/2008 |
| JP | 2010-144848 A | 7/2010 |
| JP | 3177172 U | 7/2012 |
| JP | 2012-233522 A | 11/2012 |
| KR | 20120035731 A | 4/2012 |
| KR | 101218491 B1 | 1/2013 |
| TW | 201107633 A | 3/2011 |

OTHER PUBLICATIONS

Decision to Grant a Paten dated Jan. 5, 2016, issued in counterpart Japanese Application No. 2014-262953 w/ English translation) (6 pages).

Office Action dated Sep. 20, 2017, issued in counterpart Chinese Application No. 201580036044.2, with English translation. (8 pages).

* cited by examiner

CROSS-SECTIONAL VIEW TAKEN ALONG LINE V-V

ENLARGED VIEW OF SECTION VI

CROSS-SECTIONAL VIEW TAKEN ALONG XVII-XVII

PERSPECTIVE VIEW CROSS SECTIONED ALONG LINE b-b

CROSS-SECTIONAL VIEW TAKEN ALONG b-b

SCREW DEVICE COOLING NOZZLE AND MOTION GUIDE DEVICE COOLING NOZZLE

TECHNICAL FIELD

The present invention relates to a screw device cooling nozzle for cooling a screw device, and a motion guide device cooling nozzle for cooling a motion guide device.

BACKGROUND ART

A screw device such as a ball screw is known as a mechanical element that converts rotational motion to linear motion, or converts linear motion to rotational motion. A typical screw device includes a screw shaft, a nut, and a plurality of rolling elements disposed between a helical groove of the screw and a helical groove of the nut, which face each other, in such a manner as to be capable of rolling motion. The rolling motion of the rolling element is used to achieve agile motion. Accordingly, the screw device is widely used as a mechanical element for motion conversion between rotational motion and linear motion.

When a screw device of this kind is operated under high load and/or at high speed, the screw device may generate heat due to frictional heat. When the screw device generates heat, there are problems such as that the screw shaft expands to reduce feeding accuracy, the preload to be applied to the rolling element increases due to the difference in temperature between the screw shaft and the nut, and a resin component becomes easy to be broken. An important issue for a screw device used in an environment where heat is generated is to cool the screw device.

Known screw device systems include one having a hollow screw shaft to pass coolant through the hollow space of the screw shaft, and one having a nut with a processed cooling passage to pass coolant through the cooling passage of the nut (see, for example, Patent Literature 1).

Moreover, a motion guide device that guides the movement of, for example, a table of a machine tool is known. The motion guide device includes a guide rail and a block assembled to the guide rail via a plurality of rolling elements such as balls and rollers in such a manner as to be capable of relative movement. The table is driven by a driving device such as a ball screw or linear motor. The movement of the table is guided by the motion guide device. The rolling motion of the rolling elements is used to guide the movement of the table. Accordingly, the agile movement of the table can be achieved.

In order to increase rigidity, preload, that is, the load of the rolling element sandwiched between the guide rail and the block is applied to the motion guide device. Moreover, a seal member is mounted on the block. Hence, friction occurs on the motion guide device. When the motion guide device is operated under high load and/or at high speed, the motion guide device generates heat due to the friction. The heat generation leads to the thermal expansion of the rail and the block, and by extension, a reduction in the feeding accuracy of the table, and the thermal expansion of a component to which the rail and the block are attached. The motion guide device needs to be cooled to move the table with high accuracy.

As known motion guide device cooling systems, Patent Literature 2 discloses one having a groove for cooling water formed in a guide rail of a motion guide device to supply the cooling water along the groove and cool the guide rail. Patent Literature 3 discloses one having a passage for cooling water formed in a block of a motion guide device to supply the cooling water along the passage and cool the block.

CITATION LIST

Patent Literature

Patent Literature 1: JP 2002-310258 A
Patent Literature 2: JP 2008-544185 A
Patent Literature 3: JP 2012-233522 A

SUMMARY OF INVENTION

Technical Problem

However, the known screw device cooling systems have a difficulty in processing the cooling passage in the screw shaft or nut. Moreover, there is a need to prevent the leakage of the coolant; accordingly, the known screw device cooling systems have an issue that a seal mechanism against the leakage of the coolant is required. If the screw device can be air-cooled, the issue of the liquid cooling can be solved, but a new issue that the cooling efficiency is lower than liquid cooling arises.

Moreover, the known motion guide device cooling systems also have a difficulty in processing the groove and/or the passage for cooling water in the guide rail and/or the block. Moreover, there is a need to prevent the leakage of the cooling water; accordingly, the known motion guide device cooling systems have an issue that a seal mechanism against the leakage of the cooling water is required. If the motion guide device can be air-cooled, the issue can foe solved, but a new issue that the cooling efficiency is lower than liquid cooling arises.

Hence, an object of the present invention is to provide a screw device cooling nozzle, a screw device with a cooling nozzle, and a screw device cooling system, which enable the effective gas cooling of a screw device.

Another object of the present invention is to provide a motion guide device cooling nozzle, a motion guide device with a cooling nozzle, and a motion guide device cooling system, which enable the effective gas cooling of a motion guide device.

Solution to Problem

In order to solve the above issue, a first aspect of the present invention is a screw device cooling nozzle for cooling at least one of a screw shaft and a nut, the cooling nozzle being placed in such a manner as to surround at least one of the screw shaft and the nut, the cooling nozzle including: an internal passage into which gas is introduced; an opening for releasing, a gas flow introduced into the internal passage; a deflection surface, provided adjacent to the opening, for bending the gas flow released from the opening; and a guide path for drawing in gas outside the cooling nozzle.

In order to solve the above issue, a second aspect of the present invention is a motion guide device cooling nozzle for cooling at least one of a guide rail and a block assembled to the guide rail via a rolling element in such a manner as to be capable of relative movement, the cooling nozzle including: an internal passage into which gas is introduced; an opening for releasing a gas flow introduced into the internal passage; a deflection surface, provided adjacent to the opening, for bending the gas flow released from the opening; and a guide path for drawing in gas outside the cooling nozzle.

Advantageous Effects of Invention

According to the first aspect of the present invention, the gas flow released from the opening of the cooling nozzle is bent along the deflection surface. When the gas flow is bent, a low pressure region develops on the deflection surface due to the Coanda effect to draw in gas outside the cooling nozzle via the guide path. The gas flow drawn in via the guide path is entrained in the gas flow released from the opening. Accordingly, the gas flow released from the opening is amplified. With the cooling by the amplified gas flow, even gas cooling can cool a screw device effectively.

According to the second aspect of the present invention, the gas flow released from the opening of the cooling nozzle is bent along the deflection surface. When the gas flow is bent, a low pressure region develops on the deflection surface due to the Coanda effect to draw in gas outside the cooling nozzle via the guide path. The gas flow drawn in via the guide path is entrained in the gas flow released from the opening. Accordingly, the gas flow released from the opening is amplified. The amplified gas flow cools the guide rail and/or the block; accordingly, even gas cooling can cool a motion guide device effectively.

DESCRIPTION OF EMBODIMENTS

Figure 1:
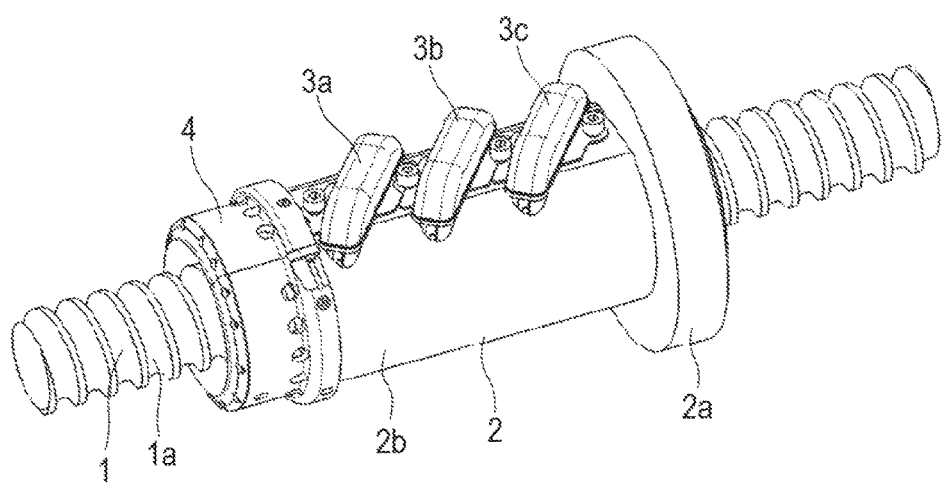
FIG. 1 is a perspective view of a ball screw to which a screw device nozzle according to a first embodiment of the present invention is attached (an example where the cooling nozzle is attached to a straight side).

A screw device cooling system (hereinafter simply referred to as the cooling system) according to a first embodiment of the present invention is described hereinafter with reference to the accompanying drawings. The cooling system of the embodiment is used to cool a ball screw as a screw device. As illustrated in FIG. 1, a cooling nozzle 4 is attached to an axial end of a nut 2. Air as gas is introduced from means for introducing gas (described below) into the cooling nozzle 4. The cooling nozzle 4 releases cylindrical airflow in an axial direction of a screw shaft 1. When the screw shaft 1 is rotated, the nut 2 moves reciprocatingly in the axial direction of the screw shaft 1. The cooling nozzle 4 releases the cylindrical airflow while moving in the axial direction together with the nut 2. The screw shaft 1 is cooled by the cylindrical airflow, which surrounds the screw shaft 1.

Figure 2:
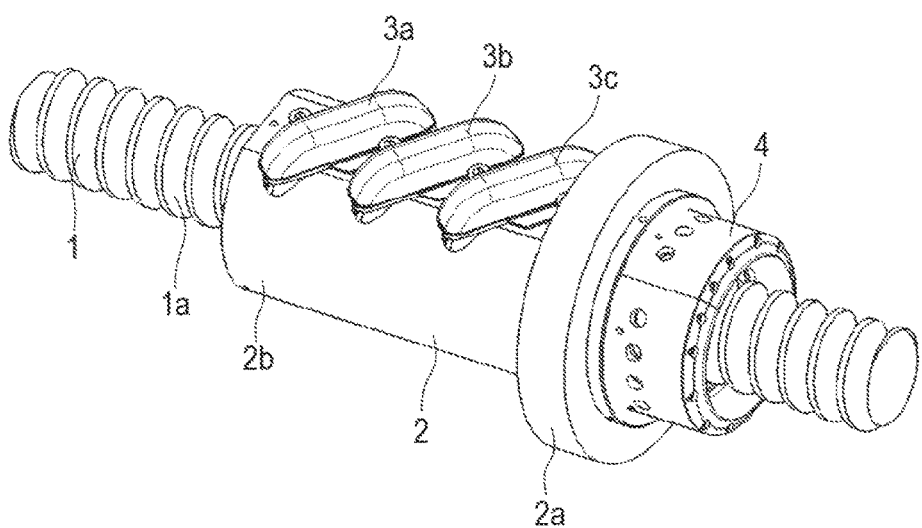
FIG. 2 is a perspective view of the; ball screw to which the screw device cooling nozzle according to the embodiment is attached (an example where the cooling nozzle is attached to a flange side).

The cooling nozzle 4 may be attached to an end on a straight 2b side (a non-flange side) of the nut 2 as illustrated in FIG. 1, may be attached to an end on a flange 2a side of the nut 2 as illustrated in FIG. 2, or may be attached to each of the straight 2b side and the flange 2a side of the nut 2.

The ball screw is publicly known, and includes the screw shaft 1 having an outer peripheral surface with a helical rolling element rolling groove 1a, the nut 2 having an inner peripheral surface with a helical loaded rolling element rolling groove (not illustrated since it is formed in an inner peripheral surface of the nut 2) facing the rolling element rolling groove 1a of the screw shaft 1, a plurality of balls (not illustrated since they are placed inside the nut 2) arranged between the rolling element rolling groove 1a of the screw shaft 1 and the loaded rolling element rolling groove of the nut 2, and circulating components 3a to 3c attached to the nut 2 to circulate the plurality of balls, the circulating components 3a to 3c each including an unloaded return path that connects one end and the other end of the loaded rolling element rolling groove of the nut 2.

The features of the cooling nozzle 4 are as follows. The cooling nozzle 4 has a ring shape and is placed in such a manner as to surround the screw shaft 1. There is a clearance between an inner periphery of the cooling nozzle 4 and the outer periphery of the screw shaft 1 so that the cooling nozzle 4 is spaced away from the screw shaft 1.

Figure 3:
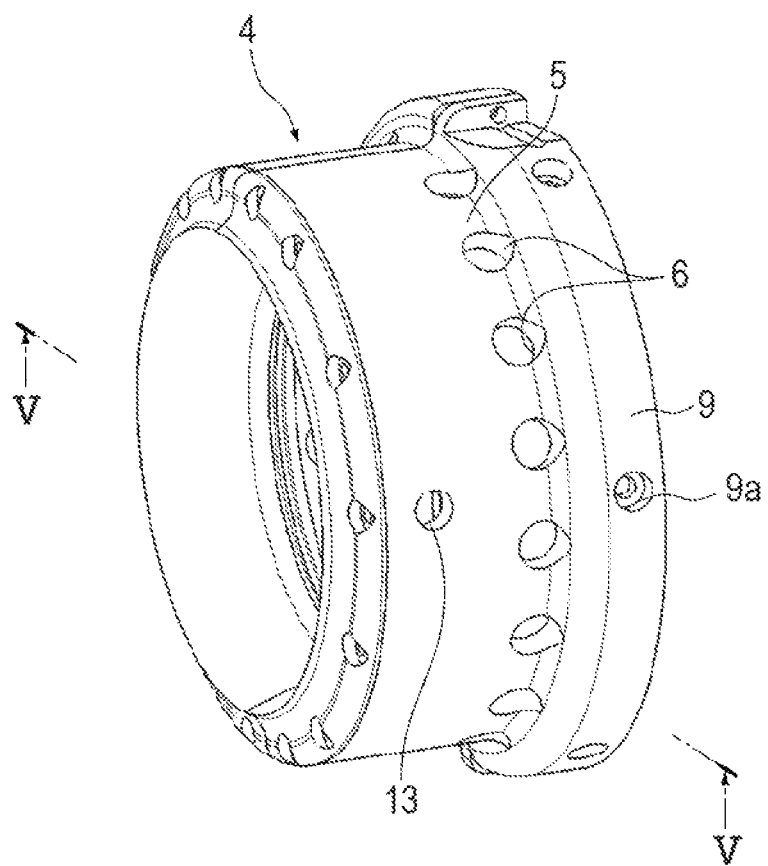
FIG. 3 is a perspective view of the cooling nozzle.

FIG. 3 illustrates a perspective view of the cooling nozzle 4 that has been removed from the nut 2. The cooling nozzle 4 includes a connection portion 5 to be connected to the nut 2, upstream of an opening 7 (see FIG. 5) described below.

The connection portion 5 of the cooling nozzle 4 is provided with an intake 6 that takes in air outside the connection portion 5. The intake 6 forms a part of a guide path 10 that draws in air outside the cooling nozzle 4 (see FIG. 5). The airflow taken in from the intake 6 is entrained in an airflow released from the opening 7 via the guide path 10. The intake 6 includes, for example, a plurality of through-holes in the connection portion 5, spaced at regular intervals in a circumferential direction. The shape of the intake 6 and its number are not particularly limited and may include a single or a plurality of slits.

A flange 9 for attachment to an end of the nut 2 is formed at an axial end of the cooling nozzle 4. The flange 9 is fitted to the outside of the nut 2. A female thread 9a for attaching the cooling nozzle 4 to the nut 2 is processed on an outer periphery of the flange 9. A bolt as a fastening member for attaching the cooling nozzle 4 to the nut 2 is threadedly engaged with the female thread 9a.

Figure 4:
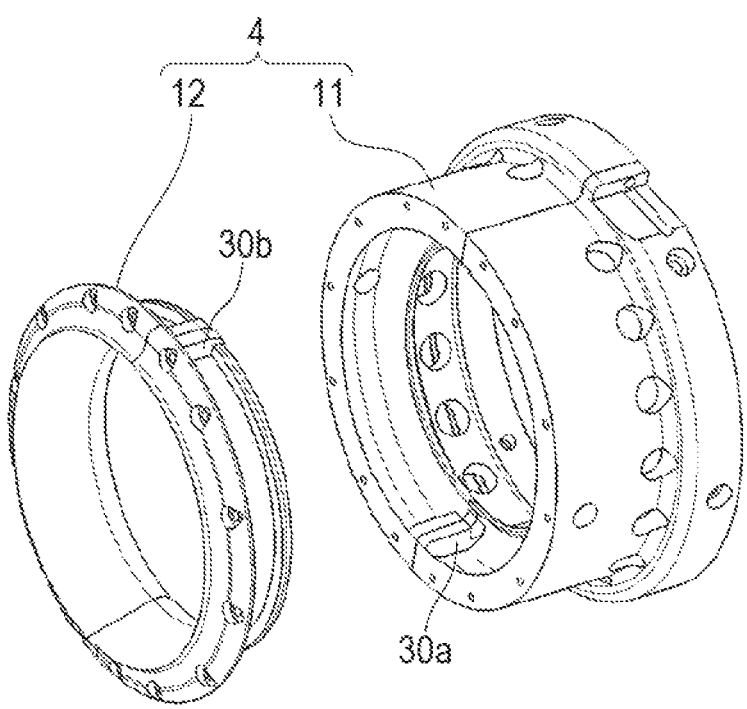
FIG. 4 is an exploded perspective view of the cooling nozzle.

As illustrated in an exploded perspective view of the cooling nozzle 4 in FIG. 4, the cooling nozzle 4 of the embodiment includes a ring-shaped first member 11, and a ring-shaped second member 12 to be fitted to the inside of the first member 11. An internal passage 8 to which air is introduced and the opening 7 from which airflow is released are defined between the first member 11 and the second member 12 (see FIG. 5). The first and second members 11 and 12 each are made of a resin molded part or metal such as aluminum. If the first and second members 11 and 12 each are made of a resin molded part, the manufacture of the first and second members 11 and 12 is facilitated. If the first and second members 11 and 12 each are made of metal such as aluminum, the heat transfer characteristics of the first and second members 11 and 12 improve to improve the cooling efficiency. The first member 11 and the second member 12 are coupled by a fastening member such as a bolt.

Figure 5:
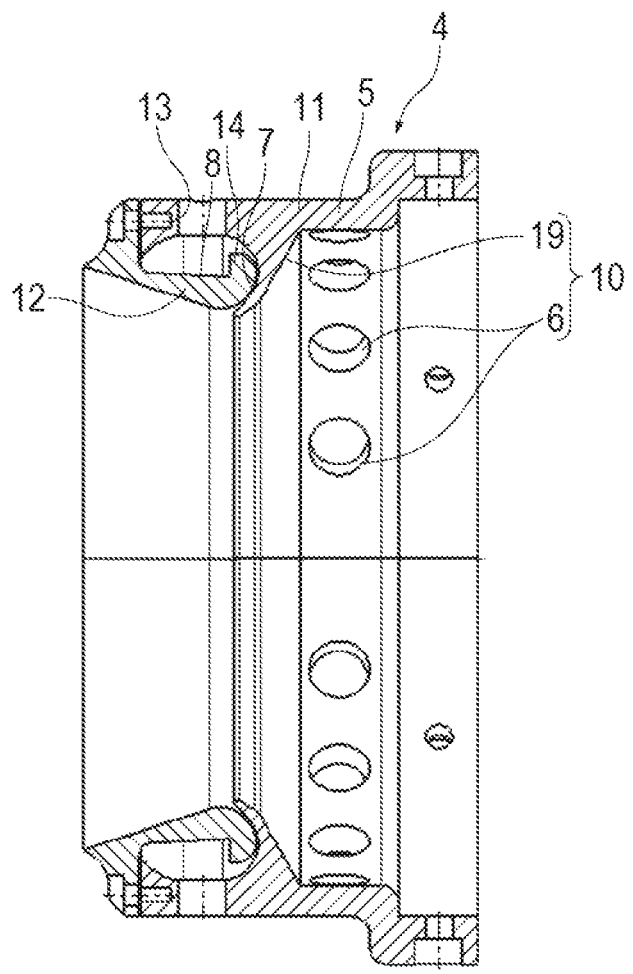
FIG. 5 is a perspective view of the cooling nozzle (a cross sectional view taken along line V-V of FIG. 3).

FIG. 5 illustrates a cross-sectional view taken along line V-V of FIG. 3. The internal passage 8 has a ring shape. The cross-sectional shape of the internal passage 8 is a substantially elliptic shape that is long in the axial direction. The internal passage 8 is defined by an inner peripheral surface of the first member 11 and an outer peripheral surface of the second member 12. Air inlets 13 communicating with the internal passage 8 are formed in the first member 11. Air is introduced into the internal passage 8 through the air inlets 13. A step 14 that reduces the width of the internal passage 8 is formed at an axial end of the internal passage 8. The step 14 plays a role of filling the air introduced from the air inlet 13 in the ring-shaped internal passage 8, and passing the air evenly into the opening 7 connected to the internal passage 8. The step 14 is formed integrally with the second member 12.

Figure 6A:
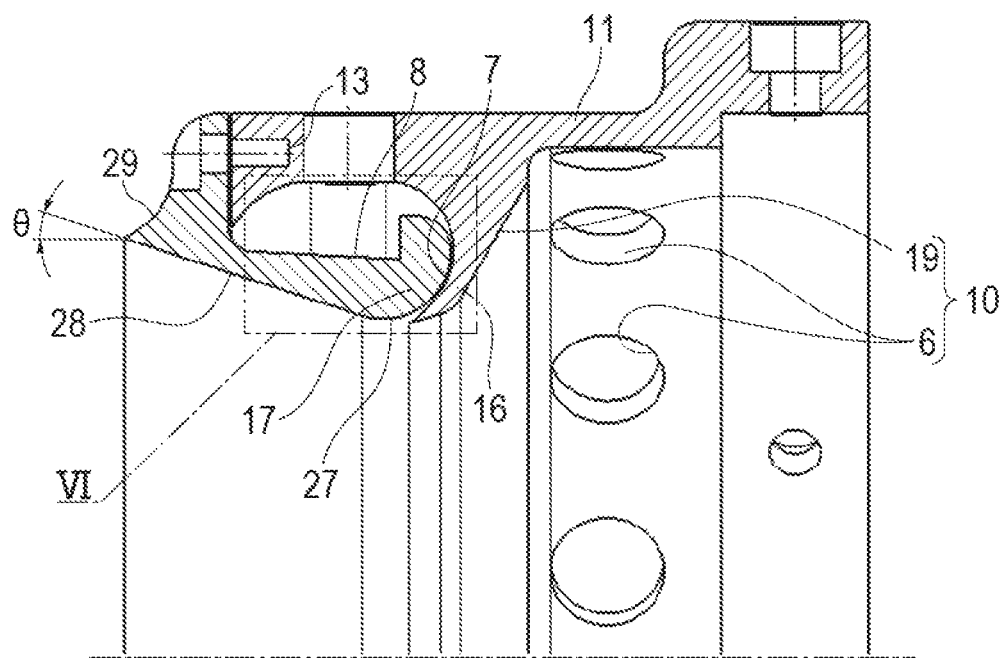
FIG. 6A is an enlarged view of an internal passage and an opening of the cooling nozzle.
Figure 6B:
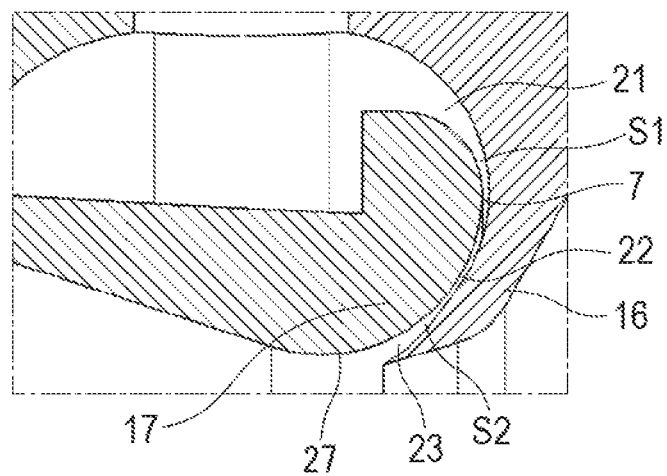
FIG. 6B is an enlarged view of section VI of FIG. 6A.

FIGS. 6A and 6B illustrate detailed diagrams of the opening 7. As illustrated in FIG. 6A, the opening 7 is continuous with the axial end of the internal passage 8, and has a ring shape concentric with the internal passage 8. The opening 7 is defined by an inner wall 16 of the first member 11 and an outer wall 17 of the second member 12. As illustrated in FIG. 6B, the cross section of the opening 7 is formed into a slit curved in an arc shape. The opening 7 includes a first tapered area S1, where the width between the inner wall 16 and the outer wall 17 is reduced downstream, between an entry 21 connecting to the internal passage 8 and a middle 22, and a second tapered area S2, where the width between the inner wall 16 and the outer wall 17 is increased downstream, between the middle 22 and an exit 23.

The minimum clearance of the opening 7 is set to, for example, equal to or greater than 50 μm and equal to or less than 110μ. For simplicity, the exaggerated clearance of the opening 7 is illustrated in FIG. 6B.

As illustrated in FIG. 6B, a deflection surface 27 is located adjacent to and downstream of the opening 7. The deflection surface 27 is formed on an inner periphery of the second member 12. The opening 7 directs the airflow toward the deflection surface 27. The deflection surface 27 is a surface where the Coanda effect occurs, that is, a surface where the airflow emerging from the opening 7 adjacent to the surface is attracted to the surface to be bent along the surface. When the airflow is bent, a low pressure region develops on the deflection surface 27 to draw in the air. The deflection surface 27 has a ring shape. The deflection surface 27 is formed into a curved surface whose inner diameter is temporarily reduced downstream from the exit of the opening 7 and then expands.

As illustrated in FIG. 6A, the cooling nozzle 4 includes diffuser 28 placed downstream of the deflection surface 27. The diffuser 28 includes a diffuser surface that further helps the flow of air to be fed to the deflection surface 27. The diffuser surface is formed into a conical shape whose inner diameter expands downstream. The diffuser surface does not bend an airflow along itself, unlike the deflection surface 27. When viewed in cross section, the curved area is the deflection surface 27, and the straight area is the diffuser surface. When viewed in cross section, an angle θ between the diffuser surface and a center line of the cooling nozzle 4 is set to, for example, equal to or greater than 15° and equal to or less than 16°.

As illustrated in FIG. 6A, the cooling nozzle 4 includes the guide path 10 that draws in the outside air, upstream of the opening 7. The guide path 10 includes the intake 6 that takes in the air outside the cooling nozzle 4, and a guide surface 19 that guides the air taken in from the intake 6 to the exit 23 of the opening 7. The guide surface 19 has a ring shape, and is located downstream of the intake 6. The guide surface 19 is formed into a taper whose width is reduced toward the opening 7.

As illustrated in FIG. 6A, the cooling nozzle 4 includes an edge 29 on a downstream end surface. The surface of the edge is formed into a curved surface that protrudes downstream progressively from the outer periphery toward the diffuser surface on the inner periphery.

Figure 7:
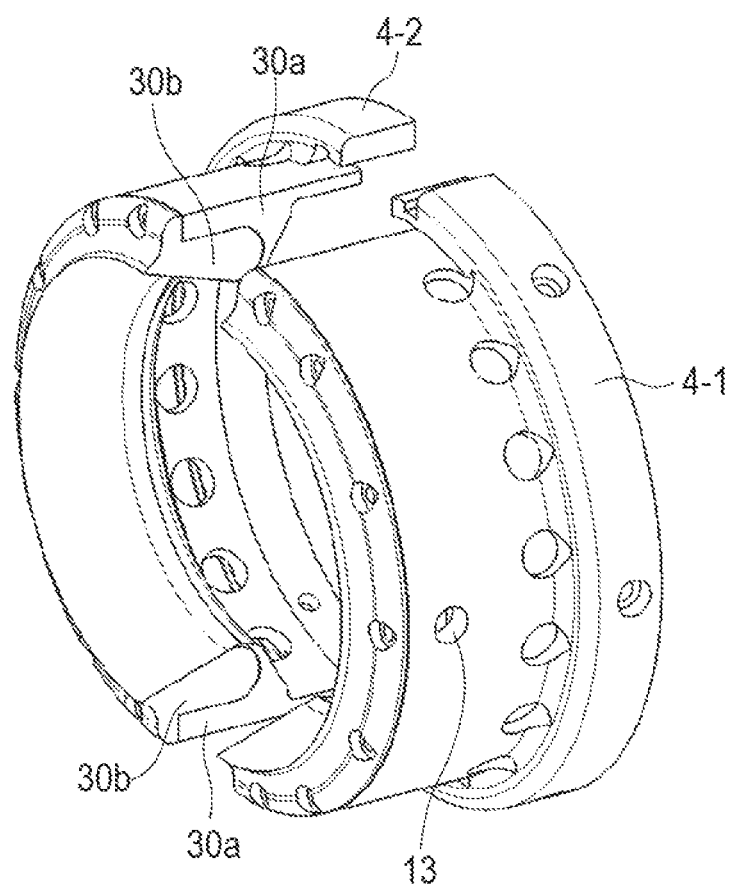
FIG. 7 is a perspective view illustrating a state where divided nozzles of the cooling nozzle are separated.

As illustrated in FIG. 7, the cooling nozzle 4 of the embodiment includes divided nozzles 4-1 and 4-2 obtained by dividing the cooling nozzle 4 into two in a semicircular shape along a cross section taken along the center line. This is to facilitate; the attachment of the cooling nozzle 4 to the nut 2. The cooling nozzle 4 is divided; accordingly, the cooling nozzle 4 can also be attached to a ball screw already integrated in a machine. The divided nozzles 4-1 and 4-2 are coupled by a fastening member such as a bolt.

The semicircular internal passage 8, the semicircular opening 7, and the semicircular deflection surface 27 are formed in each of the divided nozzles 4-1 and 4-2. Partition walls 30a and 30b that prevent the leakage of air are formed at circumferential ends of the internal passage 8 and circumferential ends of the opening 7 in each of the divided nozzles 4-1 and 4-2 (see also FIG. 4). The air inlet 13 for introducing air into the partitioned internal passage 8 is formed in each of the divided nozzles 4-1 and 4-2. The ring-shaped internal passage 8 and the ring-shaped opening 7 are partitioned by the partition walls 30a and 30b. Including such a case, the internal passage 8 and the opening 7 are said to have a substantially ring shape.

Figure 8:
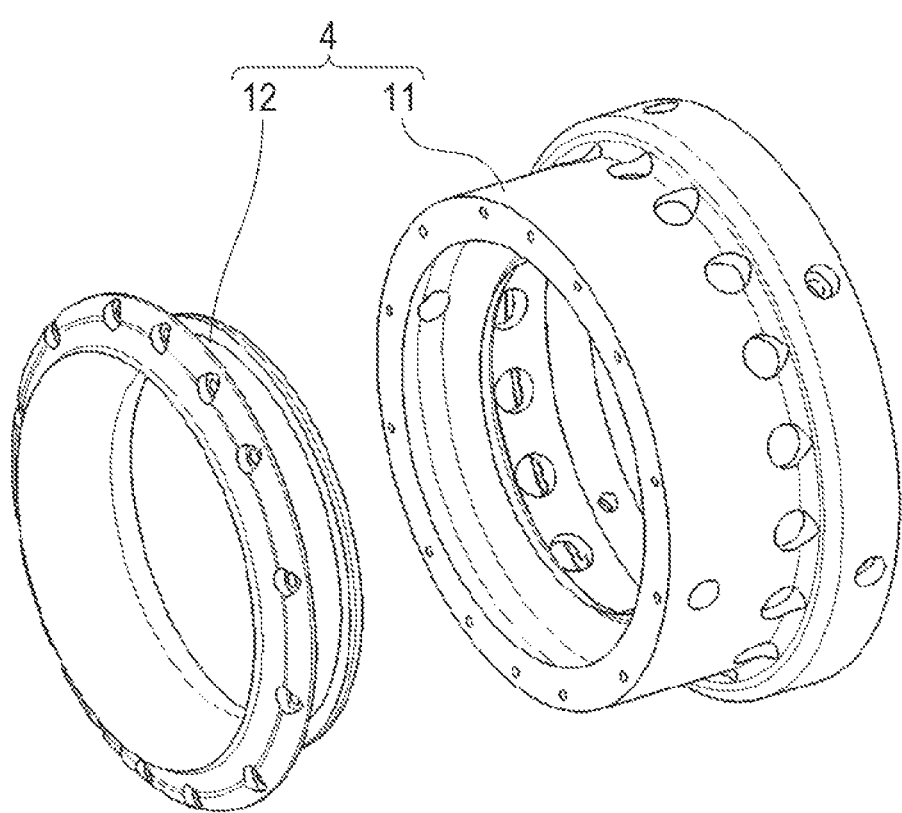
FIG. 8 is a perspective view illustrating another example of the cooling nozzle.

FIG. 8 illustrates another example of the cooling nozzle 4 of the embodiment. The cooling nozzle 4 of the embodiment is divided into two, the semicircular divided nozzles 4-1 and 4-2. However, the nozzle 4 of this example is formed into an annular shape and is not divided into two along the center line. However, there is a need to form the internal passage 8 and the opening 7 in the cooling nozzle 4 and, accordingly, is at least divided into the first member 11 and the second member 12. As in this example, the cooling nozzle 4 can also be formed into a complete ring shape.

Figure 9:
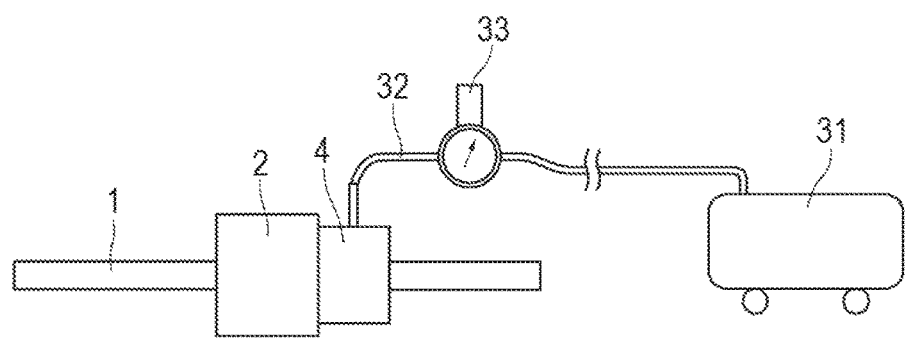
FIG. 9 is a schematic diagram of a cooling system according to the embodiment.

FIG. 9 illustrates a schematic diagram of means for introducing gas. An air pipe 32 connecting to a compression machine 31 such as a compressor is connected to the air inlet 13 of the cooling nozzle 4. A pressure reducing valve 33 as a pressure regulator is attached to the air pipe 32. The air compressed by the compression machine 31 is introduced into the cooling nozzle 4. The pressure of the compressed air is regulated by the pressure reducing valve 33 to, for example, equal to or greater than 0.2 MPa and equal to or less than 0.5 MPa (gauge pressure). It is also possible to provide an air blower such as a fan dedicated for the cooling nozzle as the means for introducing air into the cooling nozzle 4.

The operation of the cooling system is described with reference to FIG. 10. Firstly, the air pipe 32 is connected to the air inlet 13 of the cooling nozzle 4 to introduce the compressed air into the air inlet 13 (see an arrow (1) in FIG. 10). The airflow introduced into the air inlet 13 is divided into two airflows proceeding in directions opposite to each other in the ring-shaped internal passage 8, and then fills the internal passage 8.

Next, the airflow enters the opening 7 continuous with the internal passage 8, reduces its volume in the first tapered area S1 of the opening 7 to gather speed. The accelerated airflow emerges from the exit 23 of the opening 7 as a primary airflow (see an arrow (2) in FIG. 10).

The primary airflow that has emerged, from the opening 7 is directed toward the deflection surface 27. The primary airflow flows along the deflection surface 27 and is bent by the deflection surface 27. A low pressure region develops on the deflection surface 27 due to the Coanda effect. Accordingly, a secondary airflow indicated by an arrow (4) in FIG. 10 is drawn in via the guide path 10. There are the rolling elements between the screw shaft 1 and the nut 2; accordingly, it is difficult to take in air from between the screw shaft 1 and the nut 2. The intake 6 is provided in the connection portion 5 to take in air from outside the connection portion 5; accordingly, a sufficient amount of air can be taken in. The secondary airflow is entrained in the primary airflow to amplify the primary airflow. The amplified airflow is indicated by an arrow (3). The amount of air obtained by adding the primary airflow and the secondary airflow is, for example, equal to or greater than 10 times the amount of the primary airflow.

Figure 10:
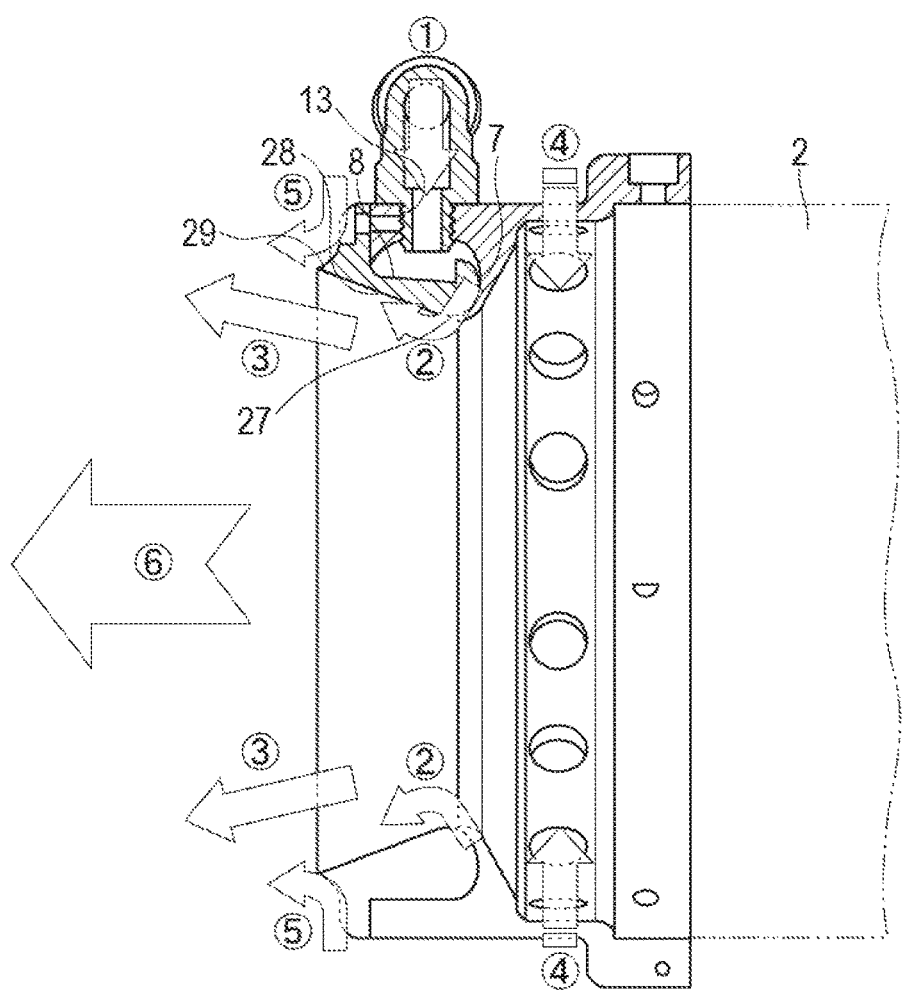
FIG. 10 is a schematic diagram illustrating airflows flowing out of the cooling nozzle.

The diffuser 28 makes the airflow indicated by the arrow (3) in FIG. 10 stronger. The airflow that has passed the diffuser 28 further entrains an airflow indicated by an arrow (5) in FIG. 10, the airflow passing the edge 29 on the end surface of the cooling nozzle 4. An airflow blown out from the cooling nozzle 4 in the end is indicated by an arrow (6) in FIG. 10. The amount of the airflow indicated by the arrow (6) in FIG. 10 is the sum of the amount of the airflow indicated by the arrow (3) in FIG. 10 and the amount of the airflow indicated by the arrow (5) in FIG. 10.

The amplified airflow flows in the axial direction of the screw shaft 1 in such a manner as to surround the screw shaft 1. The amplified airflow cools the screw shaft 1; accordingly, even air cooling can cool the screw shaft 1 effectively. The nut 2 moves reciprocatingly in the axial direction of the screw shaft 1; accordingly, the screw shaft 1 is cooled over the axial length of the screw shaft 1. The screw shaft 1 is cooled to cool not only the screw shaft 1 but also the balls and the nut 2.

Figure 11:
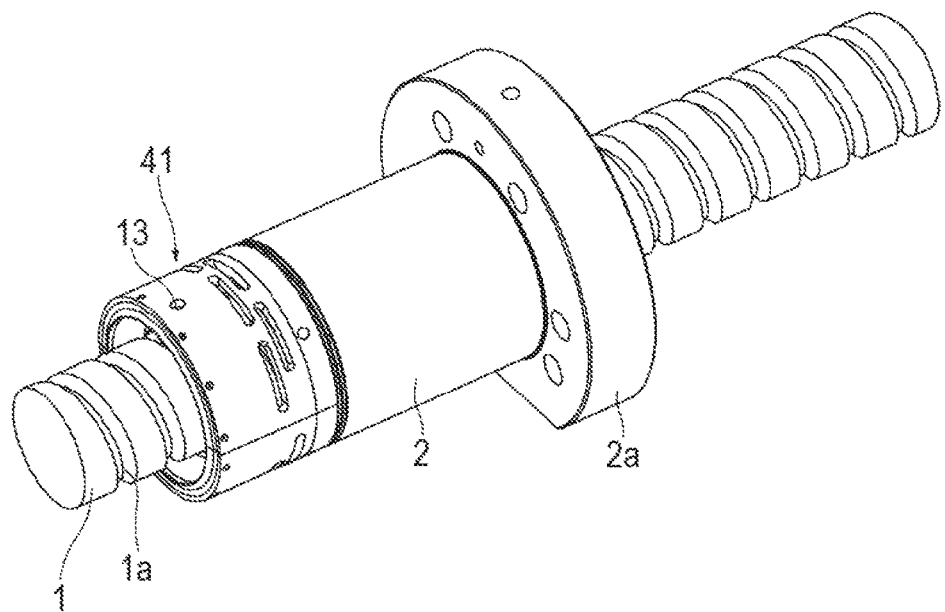
FIG. 11 is a perspective view of a ball screw to which a screw device nozzle according to a second embodiment of the present invention is attached.

FIG. 11 illustrates a ball screw to which a cooling nozzle 41 according to a second embodiment of the present invention is attached. As illustrated in FIG. 11, the cooling nozzle 41 is attached to an axial end of a nut 2. The cooling nozzle 41 includes an air inlet 13 through which compressed air is introduced. The cooling nozzle 41 releases a cylindrical airflow in an axial direction of a screw shaft 1. When the screw shaft 1 is rotated, the nut 2 moves reciprocatingly in the axial direction of the screw shaft 1. The cooling nozzle 41 releases the cylindrical airflow while moving in the axial direction together with the nut 2. The screw shaft 1 is cooled by the cylindrical airflow, which surrounds the screw shaft 1. The configurations of the screw shaft 1 and the nut 2 are the same as those illustrated in FIG. 1, so that the same reference signs are assigned to the configurations to omit their descriptions.

Figure 12A:
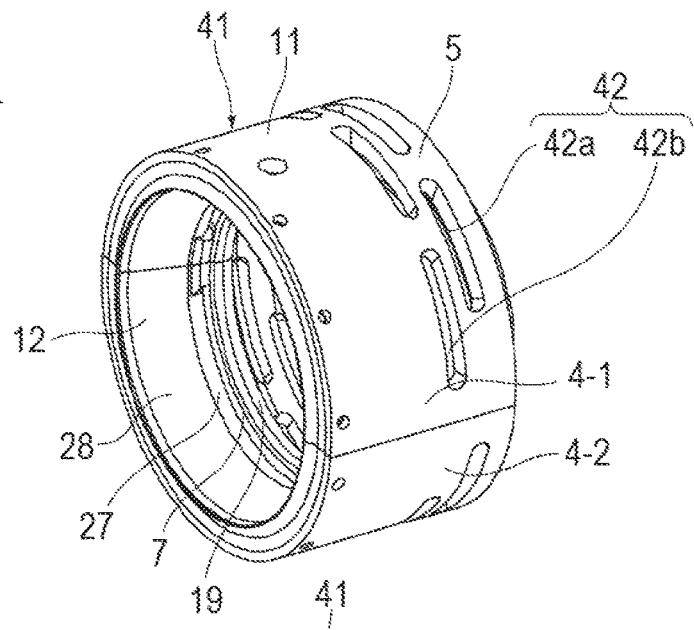
FIGS. 12A and 12B are perspective views of the cooling nozzle (FIG. 12A is a perspective view of the cooling nozzle when viewed from the front in the same direction as FIG. 11, and FIG. 12B is a perspective view of the cooling nozzle when viewed from the rear).
Figure 12B:
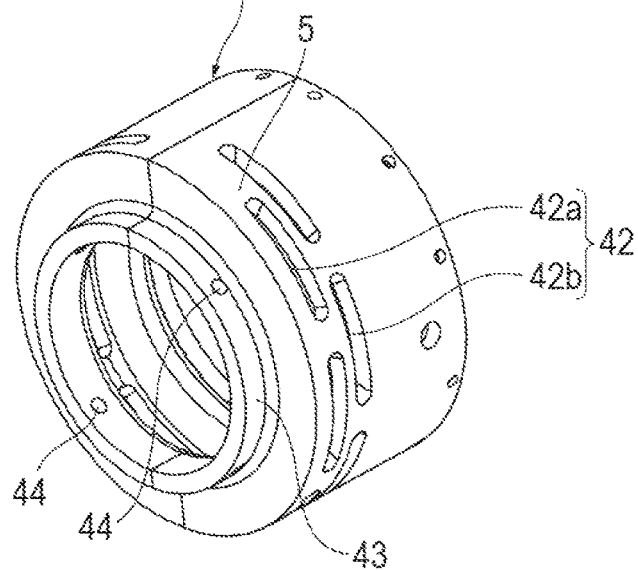

FIGS. 12A and 12B illustrate perspective views of the cooling nozzle. 41 (FIG. 12A is a perspective view of the cooling nozzle 41 when viewed from the front in the same direction as FIG. 11, and FIG. 12B is a perspective view of the cooling nozzle 41 when viewed from the rear). As illustrated in FIG. 12A the cooling nozzle 41 of this embodiment is also provided, at the connection portion 5 to the nut 2, with an intake 42. The intake 6 includes a round hole in the cooling nozzle 4 of the first embodiment (see FIG. 3), whereas the intake 42 includes slits 42a and 42b that are long in the circumferential direction in the cooling nozzle 41 of the second embodiment. A plurality of the slits 42a arranged in the circumferential direction forms one slit line. A plurality of the slits 42b arranged in the circumferential direction forms one slit line. The slits 42a of one of the slit lines, and the slits 42b of the other slit line are out of phase in the circumferential direction. As in the cooling nozzle 41 of the second embodiment, the intake 42 includes the slits 42a and 42b; accordingly, the axial dimension of the cooling nozzle 41 can be reduced in addition to that the amount of air intake from the intake 42 is ensured.

Moreover, the flange 9 to be fitted to the outside of the nut 2 is provided to an axial end of the cooling nozzle 4 in the cooling nozzle 4 in the first embodiment (see FIG. 3), whereas a ring-shaped collar 43 to be fitted to the inside of the nut 2 is provided to the axial end of the cooling nozzle 41 in the cooling nozzle 41 of the second embodiment as illustrated in FIG. 12B. A female thread 44 for attaching the cooling nozzle 41 to the nut 2 is processed on the collar 43. A screw, a bolt, or the like as a fastening member for attaching the cooling nozzle 41 to the nut 2 is threadedly engaged with the female thread 44. As in the cooling nozzle 41 of the second embodiment, the cooling nozzle 41 is fitted to the inside of the nut 2; accordingly, it is possible to ensure a space, where a seal member is attached to the nut 2.

The other configurations of the cooling nozzle 41 of the second embodiment are the same as those of the cooling nozzle 4 of the first embodiment, for example, in the point that the cooling nozzle 41 includes the ring-shaped first member 11 and the ring-shaped second member 12 to be fitted to the inside of the first member 11, in the point that the opening 7 is defined between the first member 11 and the second member 12, in the point that the deflection surface 27 is located adjacent to and downstream of the opening 7, in the point that the diffuser 28 is located adjacent to and downstream of the deflection surface 27, in the point that the guide surface 19 that guides the air taken in from the intake 42 to the opening 7 is formed upstream of the opening 7, and in the point that the cooling nozzle 41 includes the divided nozzles 4-1 and 4-2 obtained by dividing the cooling nozzle 41 into two in a semicircular shape along the cross section taken along the center line. Accordingly, the same reference signs are assigned to the other configurations to omit their descriptions.

The ball screw cooling nozzle of the present invention is not limited to being realized in the embodiments, and can be modified to various embodiments within the range that does not change the gist of the present invention.

For example, in the embodiments, the cooling nozzle is attached to the nut, and the airflow is passed toward the screw shaft. However, it is also possible to attach the cooling nozzle to the nut and pass the airflow toward the nut. Moreover, it is also possible to attach the cooling nozzle to the screw shaft and pass the airflow toward the screw shaft and/or the nut.

In the embodiments, the airflow is passed from the cooling nozzle attached to the nut toward the screw shaft. However, it is also possible to provide an opening for the screw shaft and an opening for the nut to the cooling nozzle and pass the airflow from the cooling nozzle toward the screw shaft and the nut.

In the embodiments, the cooling nozzle and the nut are separate bodies to attach the cooling nozzle to the nut. However, the cooling nozzle can also be integrated with the nut or the screw shaft.

In the embodiments, a ball screw is used as the screw device, but a roller screw or slide screw can also be used.

In the embodiments, air is used as the gas, but nitrogen gas, halogen gas, or the like can also be used. Liquid spray can also be mixed in the gas flow.

In the embodiments, the cooling nozzle is placed at the position overlapping with the screw shaft in the axial direction. However, the cooling nozzle can also be placed at a position axially displaced from the screw shaft.

EXAMPLE 1

The cooling nozzle of the embodiment was attached to the nut of the ball screw. While the ball screw was operated, air was passed in the axial direction of the screw shaft from the cooling nozzle. The operating conditions of the ball screw are as illustrated in table 1:

TABLE 1

| | |
|---|---|
| Applied load | 1.5 t |
| Maximum number of revolutions | 1900 min$^{-1}$ |
| Average number of revolutions | 419 min$^{-1}$ |
| Stroke | 350 mm |
| Maximum speed | 38.0 m/min |
| Ball | Made of Steel |
| Room Temperature | 20° C. |

Compressed airs of 0.2 MPa, 0.35 MPa, and 0.4 MPa were introduced into the cooling nozzle to measure changes in temperature of the surface of the screw shaft, of the surface of the nut, and of the ball. The temperature measurements were made when 10, 30, 60, 90, 120, 150, and 180 minutes passed.

Figure 13A:
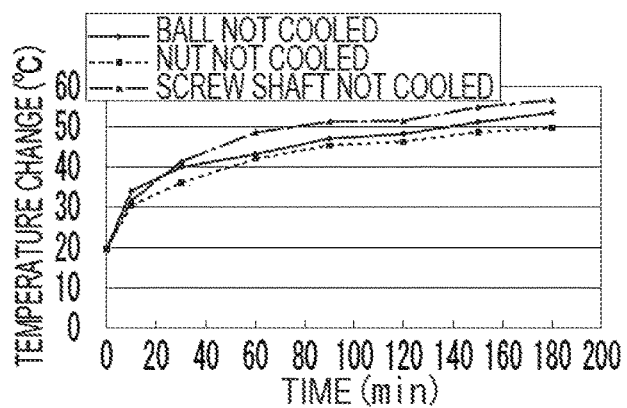
FIGS. 13A to 13D are graphs illustrating temperature measurement results of the ball screw (FIG. 13A illustrates a comparative example of when compressed air was not introduced into the cooling nozzle, and FIGS. 13B, 13C, and 13D illustrate examples of the present invention of when compressed airs of 0.2 MPa, 0.35 MPa, and 0.4 MPa were introduced into the cooling nozzle, respectively).

FIGS. 13A to 13D illustrate the temperature measurement results. FIG. 13A illustrates changes in temperature when compressed air was not introduced into the cooling nozzle. As illustrated in FIG. 13a, when the ball screw was not cooled, the temperatures of the ball, the nut, and the screw shaft increased with the passage of time. After the lapse of 180 minutes, the temperatures of the ball, the nut, and the screw shaft increased to 53.5° C., 50.0° C., and 56.6° C., respectively.

Figure 13B:
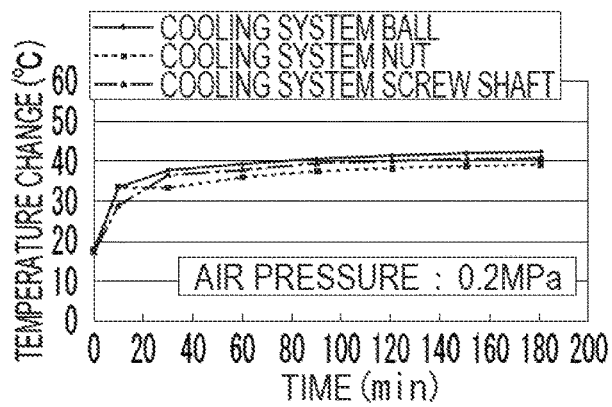
Figure 13C:
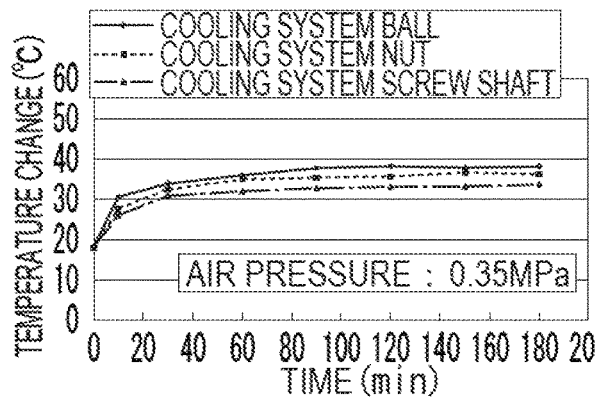
Figure 13D:
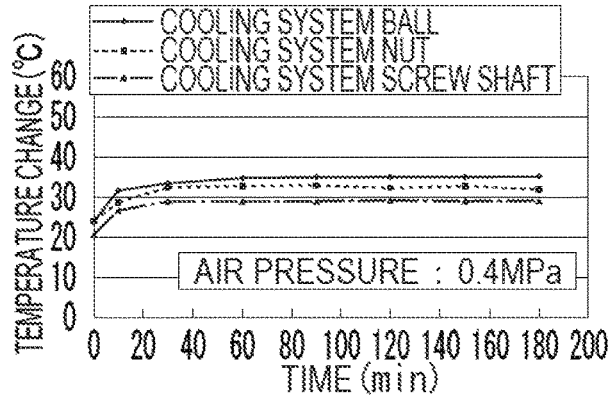

FIGS. 13B, 13C, and 13D illustrate changes in temperature when the compressed airs of 0.2 MPa, 0.35 MPa, and 0.4 MPa were introduced into the cooling nozzle, respectively. As illustrated in FIGS. 13B, 13C, and 13D, when the compressed airs were supplied to the cooling nozzle, the temperatures became substantially constant after the lapse of 30 minutes.

As the air pressure increased, the temperatures of the ball, the nut, and the screw shaft decreased. As illustrated in FIG. 13B, when the compressed air of 0.2 MPa was introduced into the cooling nozzle, the temperatures of the ball, the nut, and the screw shaft decreased to 42.4 (11.1)° C., 39.4 (10.6)° C., 41.0 (15.6)° C., respectively, after the lapse of 180 minutes. The brackets indicate reductions in temperature from when the ball screw was not cooled.

As illustrated in FIG. 13C, when the compressed air of 0.35 MPa was introduced into the cooling nozzle, the temperatures of the ball, the nut, and the screw shaft decreased to 38.1 (15.4)° C., 36.2 (13.8)° C., and 33.6 (23.0)° C., respectively, after the lapse of 180 minutes.

As illustrated in FIG. 13D, when the compressed air of 0.4 MPa was introduced into the cooling nozzle, the temperatures of the ball, the nut, and the screw shaft decreased, to 35.1 (18.1)° C., 31.8 (18.2)° C., and 29.0(27.6)° C., respectively, after the lapse of 100 minutes.

Figure 14:
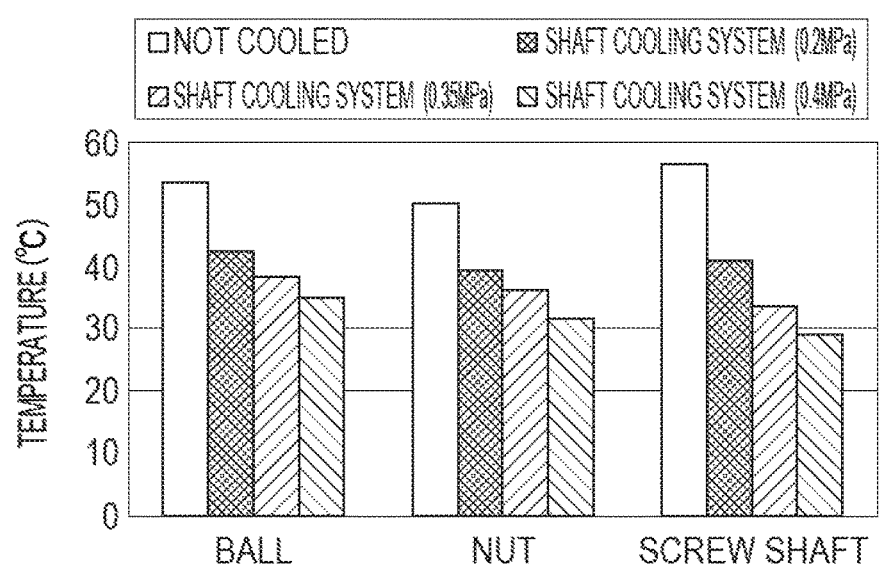
FIG. 14 is a graph where the temperatures of a ball, a nut, and a screw shaft after a lapse of 180 minutes are compared.

FIG. 14 is a graph where the temperatures of the ball, the nut, and the screw shaft after the lapse of 180 minutes are compared, which are illustrated in FIGS. 13A to 13D. It can be seen that the introduction of the compressed air into the cooling nozzle enables obtaining a higher cooling effect than the case where the compressed air was not introduced. Moreover, not only the screw shaft but also the ball and the nut can be effectively cooled.

As in the invention described in Patent Literature 1, when the nut was water-cooled, only the nut was cooled but the screw shaft was not. The difference in temperature between the nut and the screw shaft was encouraged, then there arises a difference in the amount of expansion between the nut and the screw shaft. A large pressure acts on the ball, so that conversely it leads to the heat generation of the ball despite the intention of cooling the ball. As in the example, the screw shaft was air-cooled; accordingly, the differences in temperature between the nut, the screw shaft, and the ball could foe reduced to solve the above problem of the water-cooling of the nut.

Figure 15:
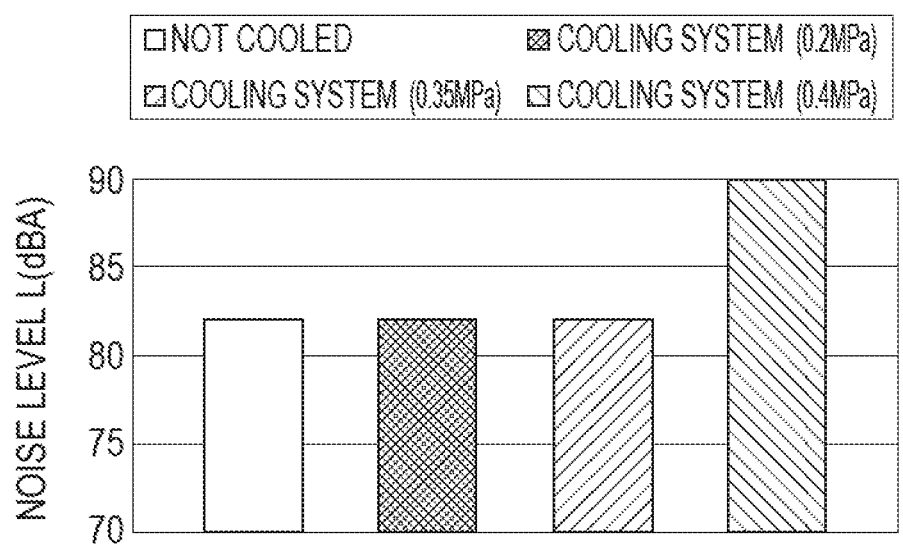
FIG. 15 is a graph where noise levels are compared.

FIG. 15 is a graph where noise is compared between when compressed air was not introduced into the cooling nozzle (not cooled) and when compressed airs of 0.2 MPa, 0.35 MPa, and 0.4 MPa were introduced. When the air pressure was set to 0.4 MPa, the noise level exceeded the running sound of the ball screw itself. Hence, setting the air pressure to 0.35 MPa or lower is desirable.

Figure 16:
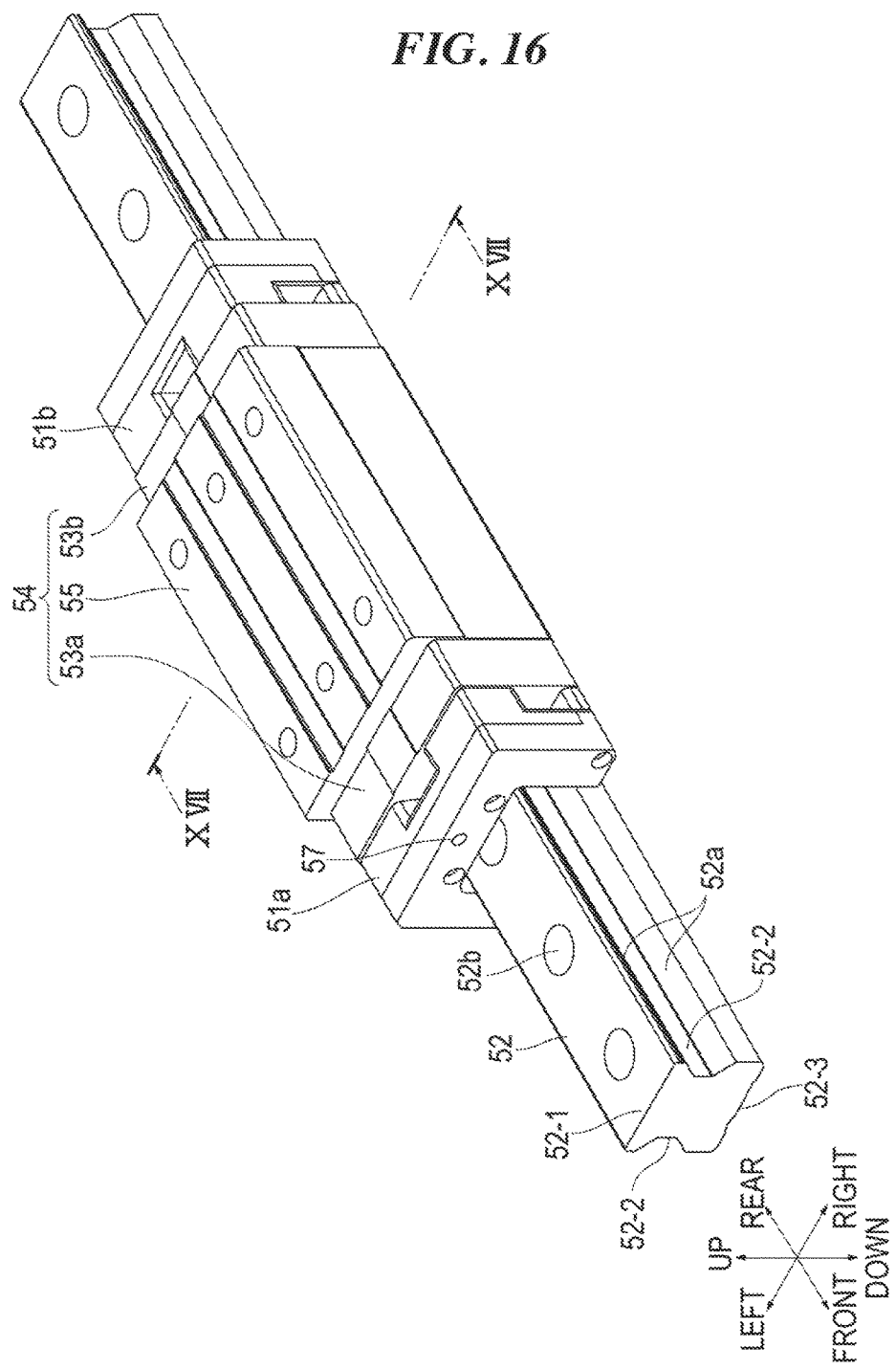
FIG. 16 is a perspective view of a linear guide to which a motion guide device cooling nozzle according to one embodiment of the present invention is attached.

FIG. 16 illustrates a perspective view of a linear guide as a motion guide device to which motion guide device cooling nozzles 51a and 51b according to one embodiment of the present invention are attached. The configuration of the linear guide is described below using directions with respect to a guide rail 52 placed on a horizontal plane when viewed in a length direction thereof, that is, a left-and-right direction, an up-and-down direction, and a front-and-rear direction, which are illustrated in FIG. 16. Naturally, the placement of the linear guide is not limited to such left, right, up, down, front, and rear.

As illustrated in FIG. 16, the linear guide includes the guide rail 52 that is long in the front-and-rear direction, and a block 54 assembled to the guide rail 52 in such a manner as to be movable in the front-and-rear direction. The guide rail 52 and the block 54 of the linear guide are publicly known. A plurality of strips of rolling element rolling portions 52a where roiling elements such as balls and rollers perform rolling motion is formed along the length direction on the guide rail 52. The guide rail 52 includes an upper surface 52-1, a pair of left and right side surfaces 52-2, and a bottom surface 52-3. Bolt insertion holes 52b for attaching the guide rail 52 to a counterpart component are formed with constant pitches in the length direction in the upper surface 52-1 of the guide rail 52.

The block 54 is assembled to the guide rail 52 in such a manner as to straddle the guide rail 52. The block 54 includes a block body 55, and a pair of end caps 53a and 53b attached to both end surfaces in the front-and-rear direction of the block body 55. Options such as an end seal and a lubricant supply device are attached to end surfaces of the end caps 53a and 53b, if needed.

Figure 17:
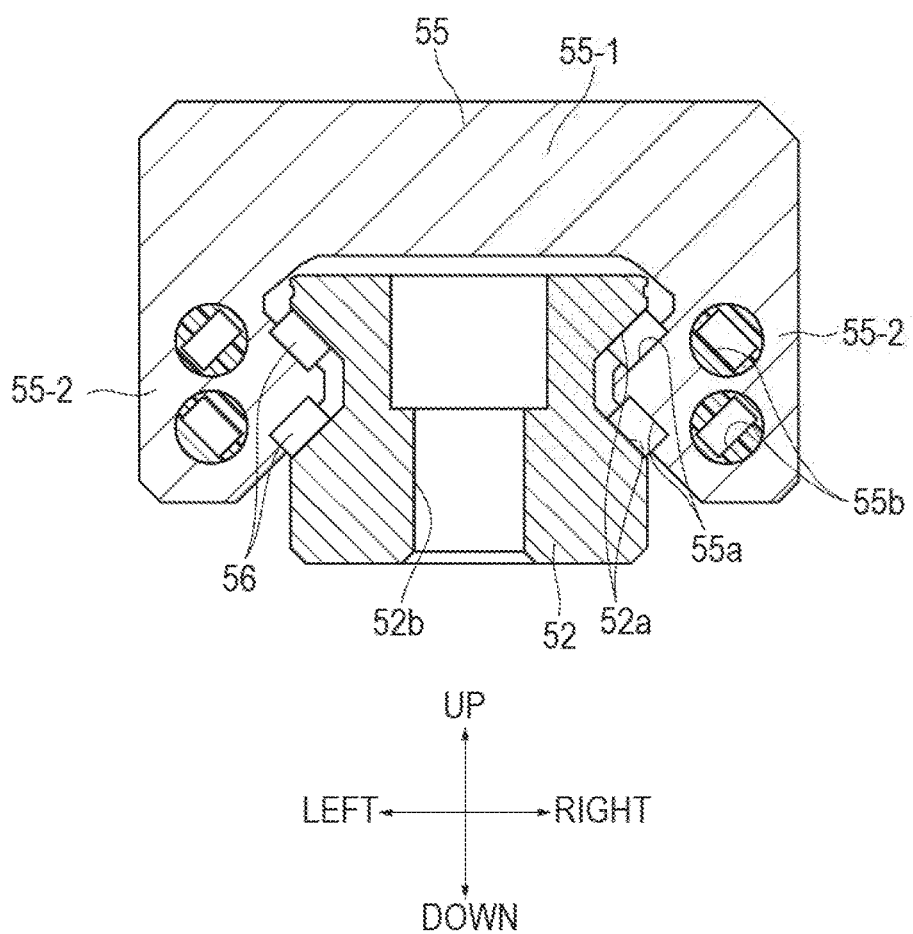
FIG. 17 is a vertical cross-sectional view of the linear guide (a cross-sectional view taken along line XVII-XVII of FIG. 16).

FIG. 17 illustrates a cross-sectional view orthogonal to the length direction of the linear guide (a cross-sectional view taken along line XVII-XVII of FIG. 16. The block body 55 includes a central portion 55-1 facing the upper surface 52-1 of the guide rail 52, and pair of leg portions 55-2 facing the side surfaces 52-2 of the guide rail 52. The block body 55 is formed into an angular U-shape in cross section. A loaded rolling element rolling port ion 55a facing the rolling element rolling portion 52a of the guide rail 52, and a return path 55b parallel to the loaded rolling element rolling portion 55a are formed in an inner surface of the block body 55, A U-shaped turn-around path connecting the loaded rolling element rolling portion 55a and the return path 55b is formed in each of the end caps 53a and 53b.

The loaded rolling element rolling portion 55a, the return path 55b, and the pair of turn-around paths form a rolling element circulation path. A plurality of rolling elements 56 is housed in the rolling element circulation path. In order to enhance the rigidity of the linear guide, preload is applied to the linear guide to compress the rolling elements 56 sandwiched between the rolling element rolling portion 52a and the loaded roiling element rolling portion 55a. When the block 54 is moved relatively to the guide rail 52, the rolling elements 56 perform rolling motion therebetween. The movement of the block 54 is relative to the guide rail 52. The block 54 may move, or the guide rail 52 may move.

As illustrated in FIG. 16, the pair of cooling nozzles 51a and 51b is attached to both end surfaces in the front-and-rear direction of the block 54. The cooling nozzles 51a and 51b each include an opening 61 (see FIG. 18B) in an inner surface facing the guide rail 52. An airflow is blown from the opening 61 to cool the guide rail 52. An inlet 57 of each o-f the cooling nozzles 51a and 51b is connected to a tube that supplies compressed air to the cooling nozzle 51a or 51b.

Figure 18A:
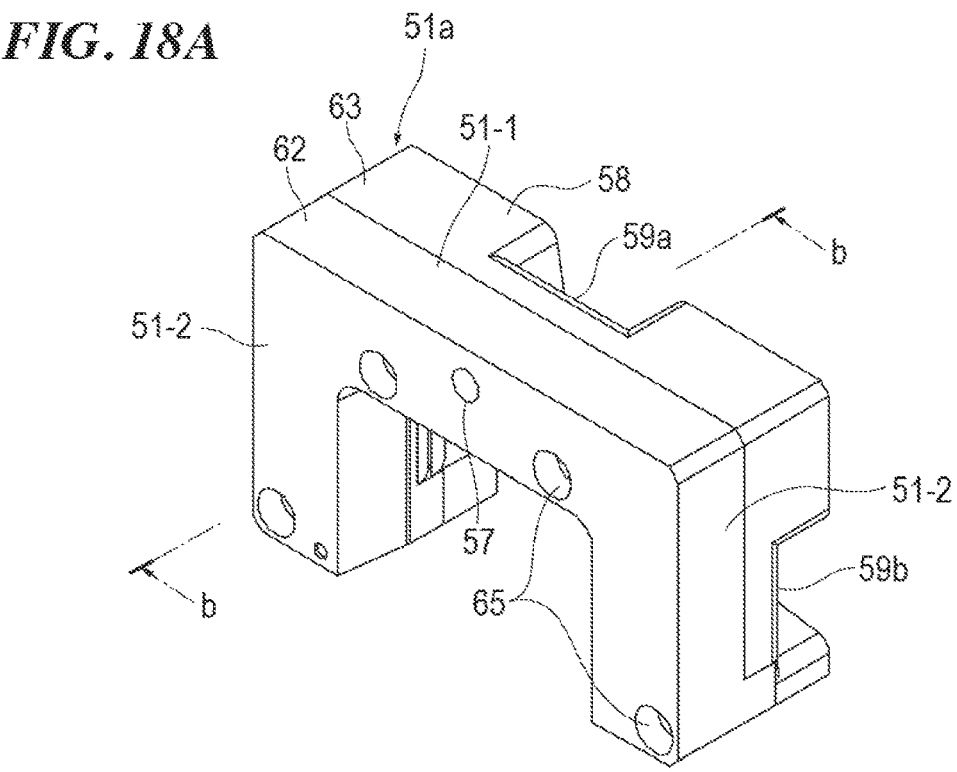
FIGS. 18A and 18B are perspective views of the cooling nozzle (FIG. 18A is an external perspective view of the cooling nozzle, and FIG. 18B is a perspective view cross sectioned along line b-b of FIG. 18A).
Figure 18B:
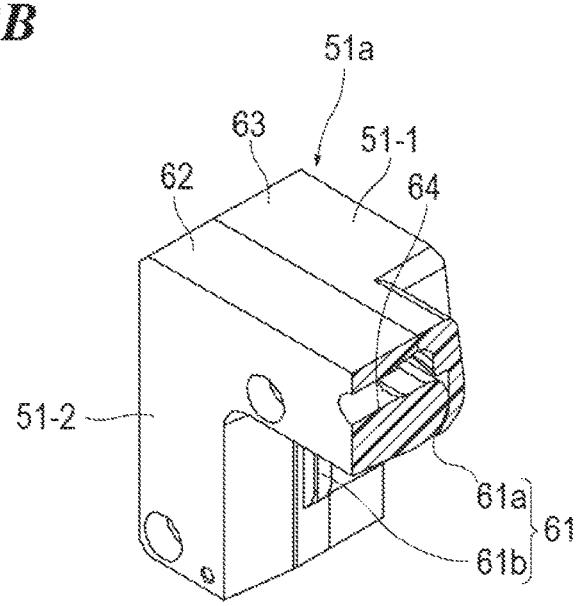

FIG. 18A illustrates an external perspective view of the cooling nozzle 51a. FIG. 18B illustrates a perspective view cross sectioned along line b-b of FIG. 18A. The cooling nozzle 51a has the same configuration as the cooling nozzle 51b; accordingly, only the configuration of the cooling nozzle 51a is described. As illustrated in FIG. 18A, the cooling nozzle 51a includes a central portion 51-1 facing the upper surface 52-1 of the guide rail 52, and a pair of leg portions 51-2 facing the side surfaces 52-2 of the guide rail 52. The cooling nozzle 51a has an angular U-shape. As illustrated in FIG. 18B, the opening 61 includes an upper surface-side opening 61a placed in the central portion 51-1, and a side surface-side opening 61b placed in the leg portion 51-2. Moreover, the cooling nozzle 51a includes, in a connection portion 58 connected to the block 54, intakes 59a and 59b through which air outside the connection portion 58 is taken in. The intakes 59a and 59b are formed in the central portion 51-1 and the leg portion 51-2. The intakes 59a and 53b form parts of guide paths 60a and 60b (see FIG. 19) that draw in air outside the cooling nozzle 51a. The cooling nozzle 51a is attached to the end cap 53a by a fastening member such as a screw. A through-hole 65 for the fastening member is formed in the cooling nozzle 51a.

The cooling nozzle 51a includes a first member 62 at one end in the length direction of the guide rail 52, and a second, member 63 at the other end. An internal passage 64 into which air is introduced, and the opening 61 for releasing an airflow toward the guide rail 52 are defined between the first member 62 and the second member 63. The internal passage 64 extends long in the left-and-right direction through the central portion 51-1 of the cooling nozzle 51a, and bends at both end portions in the left-and-right direction to extend downward through the leg portions 51-2. The first member 62 and the second member 63 are made of resin or metal. The first member 62 and the second member 63 are joined by a fastening member such as a screw.

Figure 19:
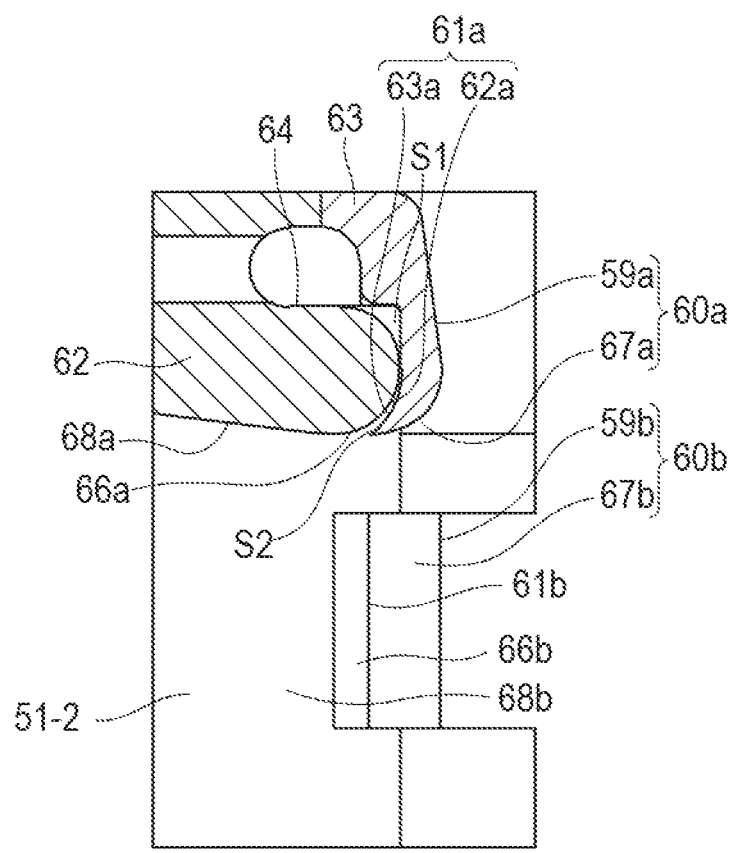
FIG. 19 is a vertical cross-sectional view of the cooling nozzle (the cross-sectional view taken along line b-b of FIG. 18A).

FIG. 19 illustrates a vertical cross-sectional view of the cooling nozzle 51a (a cross-sectional view taken along line b-b of FIG. 18A). As illustrated in FIG. 19, the upper surface-side opening 61a is defined by an opening forming surface 62a of the first member 62 and an opening forming surface 63a of the second member 63. The upper surface-side opening 61a communicates with the internal passage 64. The cross section of the upper surface-side opening 61a is formed into a slit curved in an arc shape. The upper surface-side opening 61a includes a first tapered, area S1 where the width between the opening forming surface 62a and the opening forming surface 63a is temporarily reduced, and a second tapered area S2 where the width is gradually increased, from an entry toward an exit. A deflection surface 66a is located adjacent to and downstream of the upper surface-side opening 61a. The deflection surface 66a is formed into a curved surface with an arc-shaped cross section. The cross section of the deflection surface 66a can also be formed into a polygonal shape instead of the arc. The deflection surface 66a attracts, to itself, the airflow released from the upper surface-side opening 61a to bend the airflow along the surface. When the airflow is bent, a low pressure region develops on the deflection surface 66a due to the Coanda effect to draw in the air. The guide path 60a including the intake 59a and a guide surface 67a is provided upstream of the upper surface-side opening 61a. The air is drawn in along the guide path 60a located upstream of the upper surface-side opening 61a. The drawn airflow is entrained in the gas flow released from the upper surface-side opening 61a. The amplified airflow proceeds to the upper surface 52-1 of the guide rail 52 along an inclined surface 68a.

The leg portion 51-2 of the cooling nozzle 51a is provided with the side surface-side opening 61b. As in the upper surface-side opening 61a, a deflection surface 66b is located adjacent to and downstream of the side surface-side opening 61b. An inclined surface 68b is located adjacent to and downstream of the deflection surface 66b. The guide path 60b including the intake 59b and a guide surface 67b is provided upstream of the side surface-side opening 61b. When an airflow is released from the side surface-side opening 61b, a low pressure region develops on the deflection surface 66b due to the Coanda effect to draw in the air along the guide path 60b. The drawn airflow is entrained in the airflow released from the side surface-side opening 61b. The amplified airflow proceeds to the side surface 52-2 of the guide rail 52 along the inclined surface 68b.

According to the motion guide device cooling nozzle of the embodiment, the guide rail 52 is cooled with the amplified airflow; accordingly, even gas cooling can cool the linear guide effectively.

The motion guide device of the present invention is not limited to the embodiment, but can be realized in other embodiments within the range that does not change the gist of the present invention. For example, the linear guide is used as the motion guide device in the embodiment. However, a ball spline or ball bushing can also be used.

The present description is based on Japanese Patent Application No. 2014-147836 filed on Jul. 18, 2014 and Japanese Patent Application No. 2014-262953 filed on Dec. 25, 2014, the entire contents of which are incorporated herein.

REFERENCE SIGNS LIST

1 Screw shaft
2 Nut
4, 41 Cooling nozzle (for a screw device)
4-1, 4-2 Divided nozzle
5 Connection portion
6, 42 Intake
7 Opening
8 Internal passage
10 Guide path
16 Inner wall
17 Outer wall
27 Deflection surface
28 Diffuser
29 Edge
31 Compression machine (means for introducing gas)
32 Air pipe (means for introducing gas)
33 Pressure reducing valve (pressure regulator, means for introducing gas)
51a, 51b Cooling nozzle (for a motion guide device)
52 Guide rail
54 Block
56 Rolling element
64 Internal passage
61a, 61b Opening
66a, 66b Deflection surface
60a, 60b Guide path

The invention claimed is:

1. A screw device cooling nozzle for cooling at least one of a screw shaft and a nut, the cooling nozzle being placed in such a manner as to surround the at least one of the screw shaft and the nut, the cooling nozzle comprising:
an internal passage into which gas is introduced;
an opening for releasing a gas flow introduced into the internal passage;
a deflection surface, provided adjacent to the opening, for deflecting the gas flow released from the opening; and
a guide path for drawing in gas outside the cooling nozzle, wherein the cooling nozzle further comprises a first member and a second member fitted to the first member,
the internal passage and the opening are defined between the first member and the second member,
the deflection surface is formed on the second member,
the guide path is formed on the first member, and
the cooling nozzle is configured so that the gas flow of outside air drawn in via the guide path from outside the cooling nozzle is entrained in the gas flow released from the opening adjacent to the deflection surface.

2. The screw device cooling nozzle according to claim 1, comprising a connection portion connected to the nut or the screw shaft, upstream of the opening, wherein
the guide path includes an intake for taking gas outside the connection portion into the connection portion.

3. The screw device cooling nozzle according to claim 1, comprising, in a downstream end surface thereof, an edge protruding downstream progressively from an outer periphery toward an inner periphery.

4. The screw device cooling nozzle according to claim 1, wherein the cooling nozzle is formed by coupling a plurality of arc-shaped divided nozzles.

5. A screw device with a cooling nozzle, comprising:
the screw device cooling nozzle according to claim 1; and
a screw device including the screw shaft and the nut.

6. A screw device cooling system comprising:
the screw device cooling nozzle according to claim 1; and
means for introducing gas into the internal passage of the cooling nozzle.

7. A motion guide device cooling nozzle for cooling at least one of a guide rail and a block assembled to the guide rail via a rolling element in such a manner as to be capable of relative movement, the cooling nozzle comprising:
an internal passage into which gas is introduced;
an opening for releasing a gas flow introduced into the internal passage;
a deflection surface, provided adjacent to the opening, for deflecting the gas flow released from the opening; and
a guide path for drawing in gas outside the cooling nozzle, wherein the cooling nozzle further comprises a first member and a second member fitted to the first member,
the internal passage and the opening are defined between the first member and the second member,
the deflection surface is formed on the second member,
the guide path is formed on the first member, and
the cooling nozzle is configured so that the gas flow of outside air drawn in via the guide path from outside the cooling nozzle is entrained in the gas flow released from the opening adjacent to the deflection surface.

8. The screw device cooling nozzle according to claim 2, comprising, in a downstream end surface thereof, an edge protruding downstream progressively from an outer periphery toward an inner periphery.

9. The screw device cooling nozzle according to claim 2, wherein the cooling nozzle is formed by coupling a plurality of arc-shaped divided nozzles.

10. The screw device cooling nozzle according to claim 3, wherein the cooling nozzle is formed by coupling a plurality of arc-shaped divided nozzles.

11. A screw device with a cooling nozzle, comprising:
the screw device cooling nozzle according to claim 2; and
a screw device including the screw shaft and the nut.

12. A screw device with a cooling nozzle, comprising:
the screw device cooling nozzle according to claim 3; and
a screw device including the screw shaft and the nut.

13. A screw device with a cooling nozzle, comprising:
the screw device cooling nozzle according to claim 4; and
a screw device including the screw shaft and the nut.

14. A screw device cooling system comprising:
the screw device cooling nozzle according to claim 2; and
means for introducing gas into the internal passage of the cooling nozzle.

15. A screw device cooling system comprising:
the screw device cooling nozzle according to claim 3; and
means for introducing gas into the internal passage of the cooling nozzle.

16. A screw device cooling system comprising:
the screw device cooling nozzle according to claim 4; and
means for introducing gas into the internal passage of the cooling nozzle.

\* \* \* \* \*